(12) United States Patent
Nakano

(10) Patent No.: US 6,850,754 B2
(45) Date of Patent: Feb. 1, 2005

(54) INFORMATION PROCESSING APPARATUS AND CLOCK CONTROL METHOD

(75) Inventor: Masanori Nakano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 220 days.

(21) Appl. No.: 10/096,956

(22) Filed: Mar. 14, 2002

(65) Prior Publication Data

US 2002/0142724 A1 Oct. 3, 2002

(30) Foreign Application Priority Data

Mar. 23, 2001 (JP) ........................................ 2001-085815

(51) Int. Cl.[7] ................................................ H04B 1/08
(52) U.S. Cl. ................. 455/348; 455/556.1; 455/575.1; 455/125; 455/88
(58) Field of Search .............................. 455/423, 501, 455/62, 63.1, 67.11, 556.1, 556.2, 557, 558, 348, 349, 347, 575.1, 108, 125, 88, 83, 78

(56) References Cited

U.S. PATENT DOCUMENTS 6,272,575 B1 * 8/2001 Rajchel ...................... 710/102
6,327,152 B1 * 12/2001 Saye ........................... 361/732
6,356,443 B2 * 3/2002 Jenks et al. .................. 361/686
6,516,202 B1 * 2/2003 Hawkins et al. ............. 455/556

FOREIGN PATENT DOCUMENTS

| JP | 7-15390 | | 1/1995 |
| JP | 407015390 A | * | 1/1995 |
| JP | 11-017628 | * | 1/1999 |
| JP | 2000-235498 | * | 8/2000 |
| JP | 2000-289545 | * | 10/2000 |
| JP | 2002-290340 | * | 10/2002 |

* cited by examiner

Primary Examiner—Charles Craver
(74) Attorney, Agent, or Firm—Pillsbury Winthrop LLP

(57) ABSTRACT

An information processing apparatus, comprising a wireless module which performs wireless communication, the wireless module being detachably mounted, a frequency circuit which generates a plurality of frequencies, the plurality of frequencies serve as operation frequencies, a wireless communication frequency band determination unit which determines a wireless communication frequency band used by the wireless module for wireless communication, and a selection unit which selects a frequency that does not interfere with the wireless communication frequency band.

7 Claims, 5 Drawing Sheets

12b Communication frequency information database

| Wireless module ID | Communication frequency information |
|---|---|
|  |  |
|  |  |
| ⋮ | ⋮ |

INFORMATION PROCESSING APPARATUS AND CLOCK CONTROL METHOD

CROSS-REFERENCE TO RELATED APPLICATIONS

This application is based upon and claims the benefit of priority from the prior Japanese Patent Application No. 2001-085815, filed Mar. 23, 2001, the entire contents of which are incorporated herein by reference.

BACKGROUND OF THE INVENTION

1. Field of the Invention

The present invention relates to an information processing apparatus on which a wireless module is mounted to perform wireless communication, and a clock control method used in the information processing apparatus.

2. Description of the Related Art

In general, to impart a wireless communication function to an information processing apparatus such as a personal computer or portable information device (PDA [Personal Digital Assistant]), a wireless communication card implemented by an IC card or compact flash memory which has a wireless module and complies with the PCMCIA (Personal Computer Memory Card International Association) standard is mounted. The information processing apparatus can be used as a wireless module by connecting a wireless communication device such as a portable telephone or PHS (Personal Handyphone System).

When wireless communication is performed in an information processing apparatus having a wireless unit such as a wireless communication device or wireless module, noise increases at a specific wireless frequency which interferes with the operation clock used in a circuit other than the wireless unit, obstructing wireless communication. Hence, the frequency of the operation clock used in a circuit other than the wireless unit must be so designed as not to interfere with the wireless frequency.

However, it is difficult to design the operation clock of a circuit other than the wireless unit so as not to interfere with the entire wireless band in the information processing apparatus which allows mounting a plurality of wireless modules, a portable telephone, and the like, and executes wireless communication by using a plurality of wireless bands.

Even if the frequency of the operation clock is changed during the operation of the information processing apparatus, a change of simply multiplying or dividing the clock frequency by a constant cannot reduce noise generated when the operation clock used in a circuit other than the wireless unit interferes with the wireless frequency to pose a problem in wireless communication.

A technique of changing the clock during the operation of an apparatus is disclosed in, e.g., Japanese Patent Application No. 11-38885. The technique disclosed in Japanese Patent Application No. 11-38885 is a CPU clock control method of controlling the CPU clock in order to reduce EMI (Electromagnetic Interference) and decreasing the clock stepwise (constant multiplication/division) in accordance with the number of interrupt requests.

In the prior art, it is difficult to design the operation clock used in a circuit other than the wireless unit so as to prevent the operation clock used in such a circuit from interfering with the wireless communication frequency. For example, in the use of the technique disclosed in Japanese Patent Application No. 11-38885, even if the operation clock is changed during the operation of the apparatus, a change using constant multiplication/division cannot reduce noise generated when the operation clock used in a circuit other than the wireless unit interferes with the wireless frequency to pose a problem in wireless communication.

BRIEF SUMMARY OF THE INVENTION

It is an object of the present invention to provide an information processing apparatus and clock control method capable of reducing noise in wireless communication by changing the frequency of the operation clock so as not to interfere with the wireless frequency band of a wireless module used for wireless communication.

According to a first aspect of the invention, there is provided an information processing apparatus, comprising: a wireless module which performs wireless communication, the wireless module being detachably mounted; a frequency circuit which generates a plurality of frequencies, the plurality of frequencies serve as operation frequencies; a wireless communication frequency band determination unit which determines a wireless communication frequency band used by the wireless module for wireless communication; and a selection unit which selects a frequency that does not interfere with the wireless communication frequency band.

The information processing apparatus may further comprise a memory stores a database in which pieces of information representing wireless frequency bands used by a plurality of mounted wireless modules, wherein the frequency band determination unit refers to the database to determine the frequency band used by the wireless module for wireless communication.

The information processing apparatus may further comprise a frequency determination unit which determines a wireless communication frequency used by the wireless module for wireless communication; and a frequency selection unit which, when the selection unit cannot select a frequency that does not interfere with the wireless communication frequency band, selects a frequency that does not interfere with the wireless frequency determined by the frequency determination unit from the plurality of frequencies generated by the frequency circuit.

In the information processing apparatus, the frequency circuit may include the frequency circuit includes a plurality of clock oscillators which generate the plurality of frequencies to operate at predetermined clocks, and the selection unit selects the clock oscillator from the plurality of clock oscillators.

In the information processing apparatus, the frequency circuit generates a plurality of frequencies whose constant multiples do not coincide with each other in the frequency band.

According to a second aspect of the invention, there is provided a frequency control method for an information processing apparatus on which a wireless module being detachably mounted comprising: determining a wireless communication frequency band used by the wireless module for wireless communication; selecting an operation frequency which does not interfere with the wireless communication frequency band; and operating the information processing apparatus on the basis of the operation frequency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Preferred embodiments of the present invention will be described below with reference to the several views of the accompanying drawing.

Figures 1, 2:
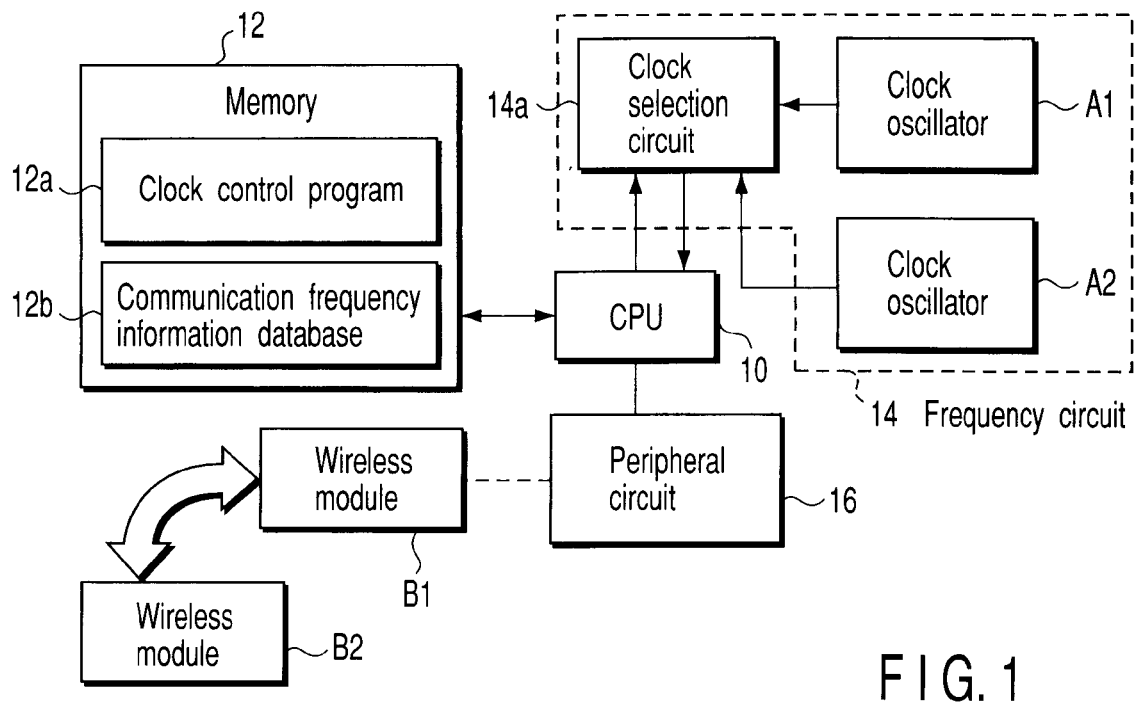
FIG. 1 is a block diagram showing the main arrangement of an information processing apparatus according to a first embodiment of the present invention.
FIG. 2 is a graph showing a data structure of a communication frequency information database 12b.

FIG. 1 is a block diagram showing the main arrangement of an information processing apparatus according to a first embodiment of the present invention. The information processing apparatus is implemented by a computer which loads a program recorded on a recording medium such as a CD-ROM, DVD, or magnetic disk, and the operation of the apparatus is controlled by the program.

As shown in FIG. 1, the information processing apparatus in the first embodiment comprises a CPU 10, memory 12, frequency circuit 14, and peripheral circuit 16.

The CPU 10 controls the overall apparatus by executing a program stored in the memory 12. The CPU 10 executes a clock control program 12a stored in the memory 12. This realizes clock control which prevents interference between the frequency of the operation clock and the wireless frequency of a wireless module mounted to achieve wireless communication. In clock control, a frequency band used for wireless communication in the wireless module is determined. Further, a clock signal having a frequency which does not interfere with the determined frequency band is selected from clock signals of respective frequencies generated by the frequency circuit 14.

The memory 12 stores various programs and data. As for clock control, the memory 12 stores the clock control program 12a, and a communication frequency information database 12b.

The frequency circuit 14 generates a plurality of frequencies which are used as operation frequencies of the apparatus and are not constant multiples of each other. In the first embodiment, the frequency circuit 14 includes two oscillators, i.e., a clock oscillator A1 which generates at a frequency f1 and a clock oscillator A2 which generates at a frequency f2, and a clock selection circuit 14a for selecting either clock oscillator A1 or A2 under the control of the CPU 10. Since frequencies f1 and f2 are not constant multiples of each other, a constant multiple of a frequency generated by one clock oscillator does not coincide with a frequency (including constant-multiplied/divided frequencies) generated by the other.

The peripheral circuit 16 represents various units which constitute the information processing apparatus and include a unit on which a wireless module for wireless communication is mounted. The peripheral circuit 16 interfaces with the wireless communication module and CPU 10.

In the first embodiment, the information processing apparatus can use wireless modules B1 and B2 with different wireless communication bands used. More specifically, wireless modules B1 and B2 include various forms of wireless modules such as a PHS PC card, a portable telephone interface card and portable telephone, and a PHS interface card and PHS terminal. They will be generally referred to as wireless modules.

The wireless frequency band used by the wireless module for wireless communication is, e.g., 800 MHz (base station transmission frequency: 810 to 826 MHz) or 1.5 GHz (base station transmission frequency: 1477 to 1501 MHz) for the portable telephone (PDC [Personal Digital Cellular]), 1.9 GHz (1893.5 to 1919.6 MHz) for the PHS, or 2.4 GHz (2400 to 2483.5 MHz in Japan) for Bluetooth.

FIG. 2 shows a data structure of the communication frequency information database 12b which is referred to for performing clock control together with the clock control program 12a for a plurality of wireless modules. As shown in FIG. 2, a wireless module ID for identifying a wireless module, and communication frequency information representing a wireless frequency band used by the wireless module identified by the wireless module ID are registered in the communication frequency information database 12b in correspondence with each other. The wireless module ID is, e.g., a card ID which can be recognized by mounting it on the peripheral circuit 16.

Figure 3:
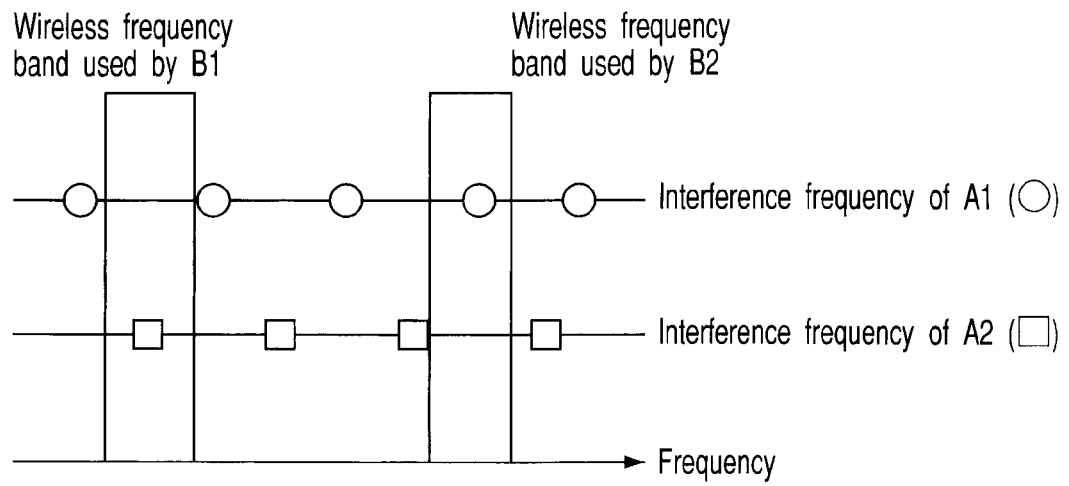
FIG. 3 is a view showing interference between the wireless frequencies of wireless modules B1 and B2 and the frequencies generated by clock oscillators A1 and A2.

FIG. 3 shows interference between the wireless frequencies of wireless modules B1 and B2 and the frequencies of clock signals generated by the clock oscillators A1 and A2. Assume that the wireless frequency bands used by wireless modules B1 and B2 are ranges represented by rectangular frames in FIG. 3. The frequency f1 of clock oscillator A1 does not interfere with the frequency used by wireless module B1, but a given order of harmonic (frequency ○ included in the frequency band of wireless module B2) interferes with the wireless frequency band used by wireless module B2. Frequency f2 of clock oscillator A2 does not interfere with the frequency band used by wireless module B2, but a given order of harmonic (frequency □ included in the frequency band of wireless module B1) interferes with the wireless frequency band used by wireless module B1.

An example of avoiding interference using the two clock oscillators A1 and A2 will be explained.

Assume that the CPU 10 operates at a basic frequency of 22 MHz when a wireless module using a 1.5-GHz band (base station transmission frequency of 1477 to 1501 MHz) is mounted. In this case, the 68th harmonic wave of 22 MHz is 1496 MHz. If the wireless module uses this frequency in wireless communication, interference occurs to degrade the wireless communication performance. To prevent this, 21 MHz is used as a basic frequency of the operation clock of the CPU 10 in addition to 22 MHz. The basic frequency of the CPU 10 can be changed to 21 MHz in this use of 1496 MHz to avoid interference in wireless communication.

Figure 4:
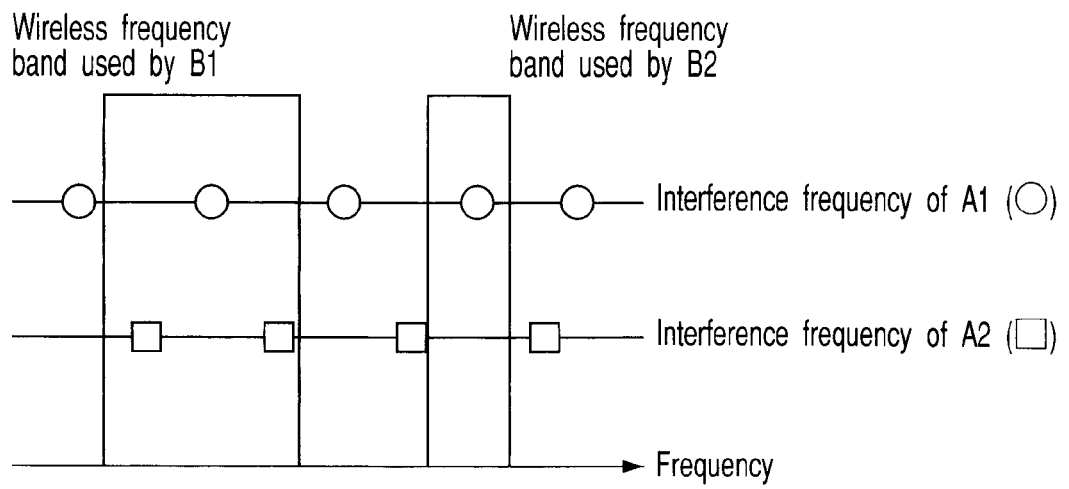
FIG. 4 is a view showing interference with the frequencies generated by the clock oscillators A1 and A2 when the wireless frequency band of the wireless module BE is wide.

FIG. 4 shows interference with the frequencies generated by clock oscillators A1 and A2 when the wireless frequency band of wireless module B1 is wider than that shown in FIG. 3. When the wireless frequency band of wireless module B1 is wide, as shown in FIG. 4, even clock oscillator A1, which can avoid the wireless frequency band of wireless module B1 shown in FIG. 3, cannot avoid interference. In this case, clock oscillators A1 and A2 are designed such that either clock oscillator A1 or A2 generates the frequency f1 or f2 which does not cause interference throughout the entire wireless frequency band of wireless module B1. In other words, clock oscillators A1 and A2 are set such that at least one of clock oscillators A1 and A2 generates the frequency f1 or f2 which does not cause interference regardless of the wireless frequency actually used for wireless communication in the wireless frequency band of wireless module B1.

The clock control operation of the information processing apparatus according to the first embodiment will be described.

To achieve operation for a specific purpose, the CPU 10 controls the clock selection circuit 14a to select either clock oscillator A1 or A2. The CPU 10 receives as an operation clock a clock signal having frequency f1 from clock oscillator A1 or frequency f2 from clock oscillator A2. At this time, the clock selection circuit 14a stops the operation of the unselected clock oscillator. Basically, the operation clock is so selected as to perform high-speed operation. For low-speed operation in order to reduce power consumption, the CPU 10 controls the frequency circuit 14 so as to attain an operation clock for a specific purpose.

When the wireless frequency used by a mounted wireless module interferes with the frequency of the operation clock used on the apparatus side, the CPU 10 changes the normal operation frequency to an operation frequency which does not cause interference in wireless communication. After the end of wireless communication, the CPU 10 changes the operation frequency to the original one.

Operation to be performed when the two wireless modules B1 and B2 using wireless frequency bands as shown in FIG. 3 are mounted will be described with reference to the flow chart shown in FIG. 5. The CPU 10 executes the clock control program 12a stored in the memory 12 to realize clock control shown in the flow chart of FIG. 5.

In this case, interference with the wireless frequency band used by the wireless module is determined when the frequency of the operation clock of the CPU 10 is the frequency f1 of the clock oscillator A1.

If the CPU 10 detects that a wireless module has been mounted on the peripheral circuit 16 (step A1), it recognizes the wireless module ID representing the type of mounted wireless module (step A2).

The CPU 10 refers to the communication frequency information database 12b stored in the memory 12 together with the clock control program 12a. The CPU 10 acquires communication frequency information corresponding to the wireless module ID, i.e., information representing a wireless frequency band used by the mounted wireless module in executing wireless communication (step A3).

After that, the CPU 10 starts normal operation (step A4).

If the CPU 10 executes a wireless communication start instruction during normal operation or receives a wireless communication request via the wireless module and peripheral circuit 16 (confirm an incoming call), i.e., if wireless communication using the wireless module starts, the CPU 10 checks whether frequency f1 of clock oscillator A1 in operation interferes with the wireless frequency band used by the mounted wireless module (step A6). Whether frequency f1 interferes with the wireless frequency band is determined based on whether a frequency which is a constant multiple of frequency f1 exists.

If the CPU 10 determines that frequency f1 does not interfere with the wireless frequency band of the communication module, it starts wireless communication without instructing the clock selection circuit 14a to change the clock oscillator (step A7). The operation clock is not changed until the end of wireless communication (step A8).

For example, when wireless module B1 using the wireless frequency band shown in FIG. 3 is mounted, frequency f1 of clock oscillator A1 does not interfere with the wireless frequency band of wireless module B1. Thus, frequency f1 of clock oscillator A1 for a specific purpose is kept in use as a CPU clock.

If the CPU 10 determines that frequency f1 interferes with the wireless frequency band of the communication module (Yes in step A6), it instructs the clock selection circuit 14a to change the clock oscillator immediately before the start of communication operation. The CPU 10 causes the clock selection circuit 14a to select clock oscillator A2 (step A9). The clock selection circuit 14a which has received the instruction from the CPU 10 starts the operation of clock oscillator A2 at rest. The circuit 14a changes the frequency of the operation clock output to the CPU 10 from frequency f1 of clock oscillator A1 to frequency f2 of clock oscillator A2. Then, the circuit 14a stops the operation of clock oscillator A1.

After the clock selection circuit 14a changes the frequency of the operation clock, the CPU 10 starts wireless communication (step A10). The operation clock is kept at frequency f2 of clock oscillator A2 until the end of wireless communication (step A11).

For example, when wireless module B2 using the wireless frequency band shown in FIG. 3 is mounted, frequency f1 of clock oscillator A1 is determined to interfere with the wireless frequency band of wireless module B2. Thus, frequency f1 is changed to frequency f2 of clock oscillator A2. As shown in FIG. 3, frequency f2 of clock oscillator A2 does not interfere with the wireless frequency band used by wireless module B2. This can avoid generation of noise which degrades the communication quality during execution of wireless communication.

After wireless communication operation ends, the CPU 10 changes the frequency of the operation clock by the same procedure as that at the start of communication. More specifically, the CPU 10 instructs the clock selection circuit 14a to change the clock oscillator, and causes the clock selection circuit 14a to select clock oscillator A1 (step A12). The clock selection circuit 14a which has received the instruction from the CPU 10 starts the operation of clock oscillator A1 at rest. The circuit 14 changes the frequency of a clock to be output to the CPU 10 from frequency f2 of clock oscillator A2 to frequency f1 of clock oscillator A1. Then, the circuit 14a stops the operation of the clock oscillator A2.

If wireless communication is executed during normal operation (step A13), clock oscillator A2 which generates a frequency that does not interfere with the wireless frequency band used by mounted wireless module B2 is selected. The frequency of the operation clock of the CPU 10 is changed to operate the information processing apparatus.

In the above description, the CPU 10 basically operates at the operation clock having frequency f1 of clock oscillator A1. In some cases, the CPU 10 is switched to the operation clock having the frequency f2 of clock oscillator A2 in order to change to, e.g., a power saving operation mode during normal operation. In the above description, the clock oscillator is switched before the start of wireless communication when wireless module B2 is mounted. If the CPU 10 is switched during normal operation to an operation mode in which it operates at the operation clock having frequency f2 of clock oscillator A2, the clock oscillator need not be switched even with wireless module B2 kept in use.

Moreover, in the above description, the operation clock of the CPU 10 is changed by the frequency circuit 14. The operation clock of a unit (peripheral circuit 16) of the information processing apparatus other than the CPU 10 is also changed.

In this fashion, when wireless communication is to be executed, the frequency circuit 14 selects a frequency which does not interfere with the wireless communication band used by the wireless module, and the information processing apparatus (except for the wireless unit) is operated at the operation clock having the selected frequency. As a result, noise generated in wireless communication can be reduced to improve the wireless communication quality. When wireless communication is not performed, the information processing apparatus can be operated at an operation clock having a frequency for a predetermined purpose such that the CPU 10 is operated at high speed.

Operation to be performed when the two wireless modules B1 and B2 using wireless frequency bands as shown in FIG. 4 are used will be described with reference to the flow chart shown in FIG. 6. The wireless frequency band used by wireless module B1 interferes with frequency f1 of clock oscillator A1 because the wireless frequency band is wider than that of wireless module B1 shown in FIG. 3. Clock oscillators A1 and A2 of the frequency circuit 14 are designed such that either clock oscillator A1 or A2 generates frequency f1 or f2 which does not cause interference throughout the entire wireless frequency band of wireless module B1. That is, clock oscillators A1 and A2 are designed such that constant multiples of frequencies f1 and f2 generated by the clock oscillators A1 and A2 do not coincide with the wireless frequency band of a mounted wireless module.

Figure 5:
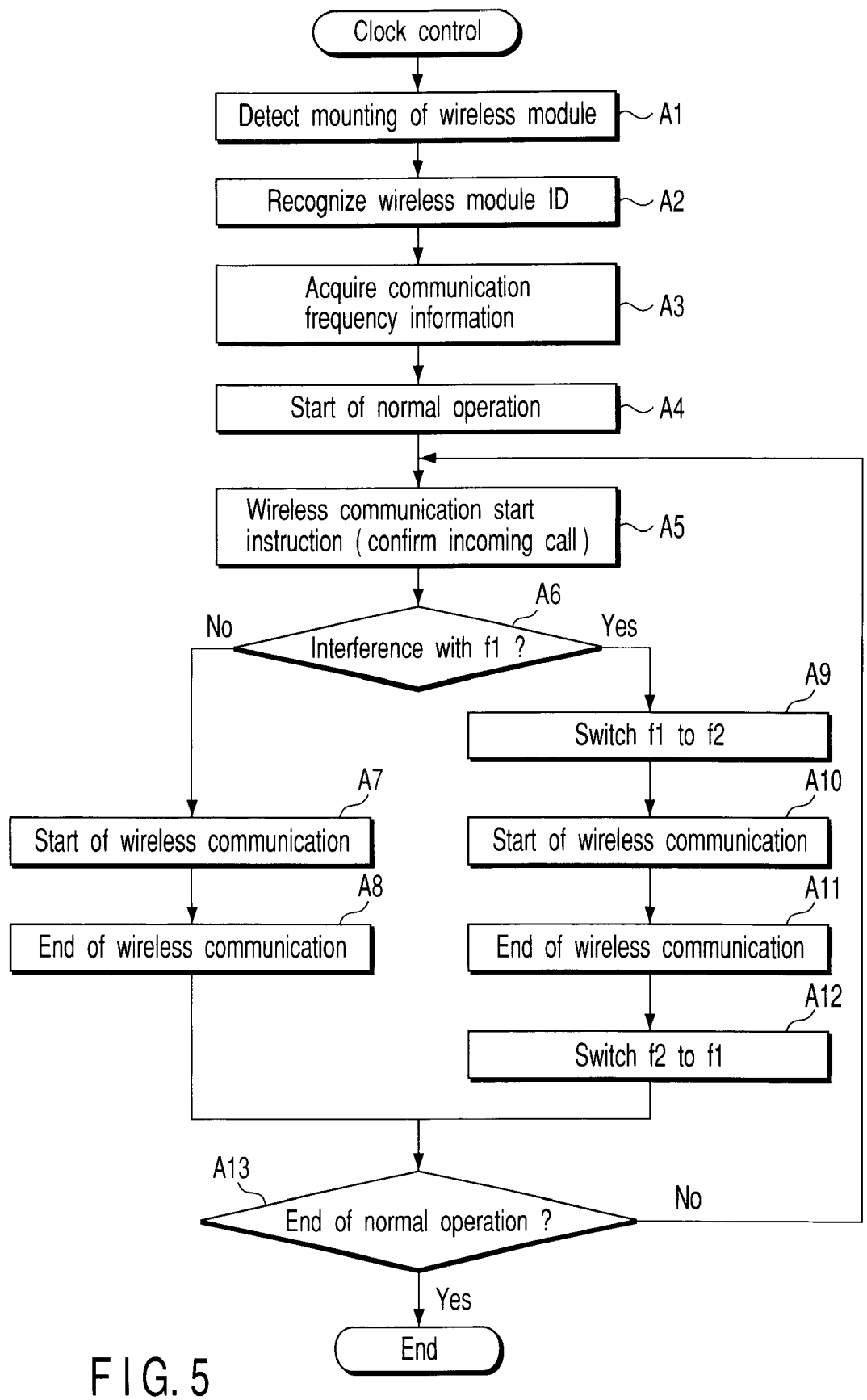
FIG. 5 is a flow chart for explaining clock control of determining the wireless frequency band used by a communication module and changing the operation frequency.
Figure 6:
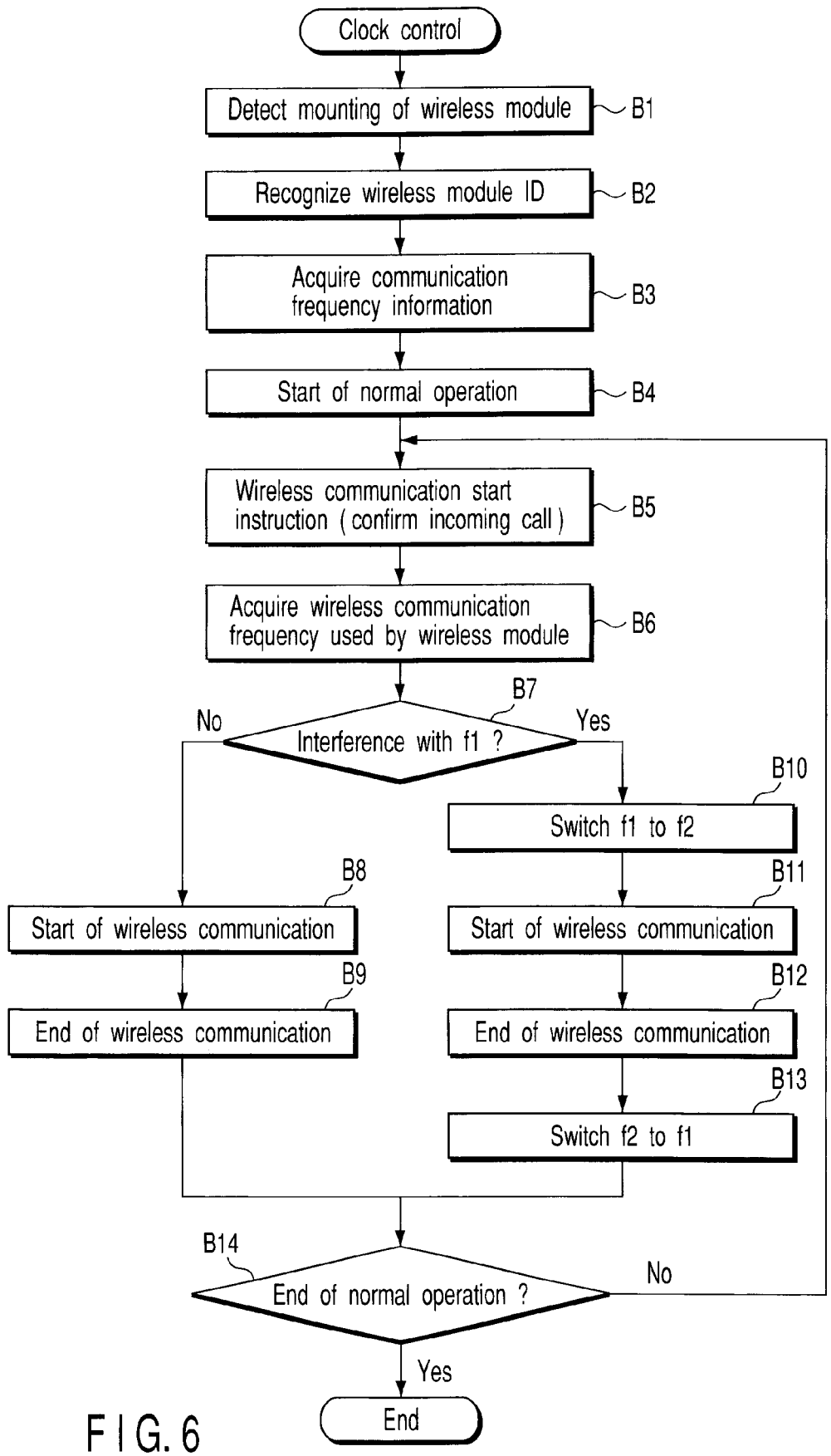
FIG. 6 is a flow chart for explaining clock control of determining the wireless frequency and changing the operation frequency when the wireless frequency band used by the communication module is wide.

Clock control shown in the flow chart of FIG. 6 is done basically similar to clock control shown in the flow chart of FIG. 5. Steps B1 to B5 correspond to steps A1 to A5, steps B7 to B14 correspond to steps A6 to A13, and a detailed description thereof will be omitted.

The wireless module mounted on the information processing apparatus determines the wireless frequency used for wireless communication in establishing a wireless communication channel between the mounted wireless module and a communication partner device (wireless module or the like) in accordance with a wireless communication start instruction from the CPU 10.

In the clock control shown in the flow chart of FIG. 6, the CPU 10 acquires from the wireless module the wireless communication frequency used by the mounted wireless module at the start of wireless communication in step B6. The CPU 10 checks whether frequency f1 of clock oscillator A1 interferes with the wireless communication frequency (step B7). If frequency f1 of clock oscillator A1 interferes with the wireless frequency, the CPU 10 causes the clock selection circuit 14a to dynamically change the frequency so as to select clock oscillator A2 and use frequency f2.

As shown in FIG. 4, the wireless frequency band used by wireless module B1 is wide, and the frequencies of clock oscillators A1 and A2 cannot avoid interference with this frequency band. Even in this case, the wireless frequency used by the wireless module for wireless communication is determined. Clock oscillator A1 or A2 which generates a frequency that does not interfere with the wireless frequency is selected. The frequency of the selected clock oscillator can be used as the frequency of the operation clock of the information processing apparatus (except for the wireless unit). Therefore, noise generated in wireless communication can be reduced to improve the wireless communication quality.

The second embodiment will be described.

Figure 7:
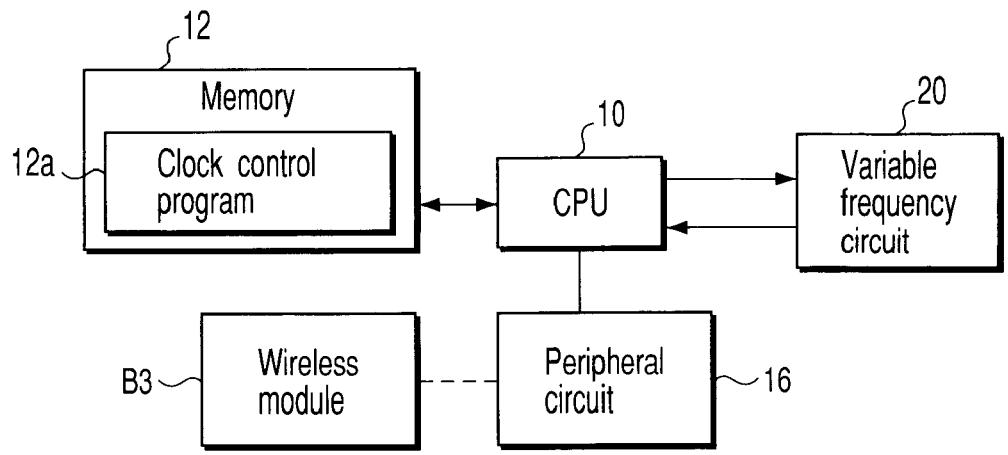
FIG. 7 is a block diagram showing the main arrangement of an information processing apparatus according to a second embodiment of the present invention.

FIG. 7 is a block diagram showing the main arrangement of an information processing apparatus according to the second embodiment of the present invention. As shown in FIG. 7, the information processing apparatus in the second embodiment comprises a CPU 10, memory 12, peripheral circuit 16, and variable frequency circuit 20.

The information processing apparatus of the second embodiment does not adopt the frequency circuit 14 having two clock oscillators A1 and A2, unlike the information processing apparatus of the first embodiment. Instead, the variable frequency circuit 20 using a PLL (Phase Locked Loop) or the like is arranged to change the frequency. The frequency changeable by the variable frequency circuit 20 includes a plurality of frequencies which are not constant-multiplied/divided frequencies of a frequency before change and are not constant multiples of each other.

The operation of the information processing apparatus (clock control program 12a) in the second embodiment is the same as in the first embodiment, and a detailed description thereof will be omitted. More specifically, an operation clock having a frequency which does not interfere with the frequency used for wireless communication by a wireless module B3 mounted on the information processing apparatus is set as the operation clock of the CPU 10.

The use of the variable frequency circuit 20 capable of successively changing the frequency instead of generating a definite number of frequencies can flexibly change the operation frequency of the apparatus. The operation frequency of the apparatus can be flexibly changed in correspondence with a change in wireless communication quality or a difference in wireless communication unit 18 (wireless frequency used for wireless communication), thus improving the wireless communication quality.

The third embodiment will be described.

Figure 8:
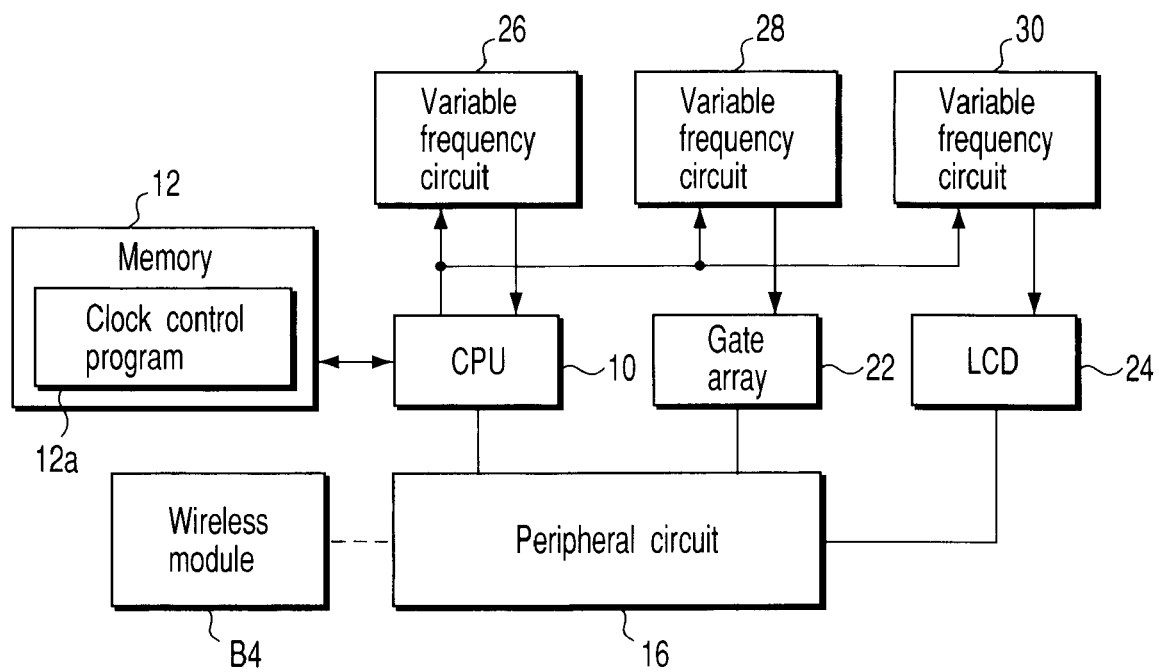
FIG. 8 is a block diagram showing the main arrangement of an information processing apparatus according to a third embodiment of the present invention.

FIG. 8 is a block diagram showing the main arrangement of an information processing apparatus according to the third embodiment of the present invention. As shown in FIG. 8, the information processing apparatus in the third embodiment comprises a CPU 10, a memory 12, a peripheral circuit 16, chips or modules such as a gate array 22 and LCD 24, and clock control variable frequency circuits 26, 28, and 30 which respectively correspond to a plurality of units such as the CPU 10 and the chips or modules (gate array 22 and LCD 24) that operate at predetermined clocks. The variable frequency circuits 26, 28, and 30 are circuits for generating a CPU clock, gate array clock, and LCD clock, respectively. These circuits 26, 28, and 30 are controlled by a clock control program 12a under the control of the CPU 10. The circuits 26, 38, and 30 can generate a plurality of frequencies which are not constant multiplies of each other.

The operation of the information processing apparatus (clock control program 12a) in the third embodiment is the same as that in the first embodiment, and a detailed description thereof will be omitted. That is, an operation clock having a frequency which does not interfere with the frequency used for wireless communication by a wireless module B4 mounted on the information processing apparatus is set by the variable frequency circuit 26 for the operation clock of the CPU 10, by the variable frequency circuit 28 for the operation clock of the gate array 22, and by the variable frequency circuit 30 for the operation clock of the LCD 24.

In this way, the operation frequency can be individually changed in accordance with each unit which constitutes the apparatus. Each unit can be operated at an optimal operation frequency without adversely affecting the wireless frequency.

Note that the method described in each of the above-described embodiments can be written as a clock control program executable by a computer on a recording medium such as a magnetic disk (floppy disk, hard disk, or the like) and an optical disk (CD-ROM, DVD, or the like), or in a semiconductor memory. This program-recorded medium can be provided to various apparatuses. Alternatively, the clock control program can be transmitted via a communication medium and provided to various apparatuses. The computer which implements the apparatus loads the clock control program recorded on the recording medium, or receives the clock control program via the communication medium. This program controls the operation of the computer to execute the above-described processing.

The present invention is not limited to the above-described embodiments, and can be variously modified without departing from the spirit and scope of the invention in practical use. The embodiments include inventions on various stages, and various inventions can be extracted by an appropriate combination of structural elements disclosed. For example, when an effect is obtained even by omitting several structural elements from all those described in the embodiments, the arrangement from which these structural elements are omitted can be extracted as an invention.

As has been described in detail above, according to the present invention, a wireless frequency band used by a mounted wireless module (further, a wireless frequency used for wireless communication) is checked. The operation frequency of the information processing apparatus is so changed as not to interfere with wireless communication. This can reduce noise in wireless communication to improve the communication quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus, comprising:
   a memory which stores a database including pieces of information representing wireless frequency bands used by a plurality of mounted wireless modules;
   a wireless module which performs wireless communication, said wireless module being detachably mounted;
   a frequency circuit which generates a plurality of frequencies, said plurality of frequencies serve as operation frequencies;
   a wireless communication frequency band determination unit which determines a wireless communication frequency band used by the wireless module for wireless communication by referring to said database for the determination; and
   a selection unit which selects a frequency that does not interfere with the wireless communication frequency band.

2. The apparatus according to claim 1, wherein
   said frequency circuit includes a plurality of clock oscillators which generate the plurality of frequencies to operate at predetermined clocks, and
   said selection unit selects the clock oscillator from the plurality of clock oscillators.

3. The apparatus according to claim 1, wherein said frequency circuit generates a plurality of frequencies whose constant multiples do not coincide with each other in the frequency band.

4. An information processing apparatus, comprising:
   a wireless module which performs wireless communication, said wireless module being detachably mounted;
   a frequency circuit which generates a plurality of frequencies, said plurality of frequencies serve as operation frequencies;
   a wireless communication frequency band determination unit which determines a wireless communication frequency band used by the wireless module for wireless communication;
   a selection unit which selects a frequency that does not interfere with the wireless communication frequency band;
   a frequency determination unit which determines a wireless communication frequency used by the wireless module for wireless communication; and
   a frequency selection unit which, when said selection unit cannot select a frequency that does not interfere with the wireless communication frequency band, selects a frequency that does not interfere with the wireless frequency determined by said frequency determination unit from the plurality of frequencies generated by said frequency circuit.

5. The apparatus according to claim 4, wherein
   said frequency circuit includes a plurality of clock oscillators which generate the plurality of frequencies to operate at predetermined clocks, and
   said selection unit selects the clock oscillator from the plurality of clock oscillators.

6. The apparatus according to claim 4, wherein said frequency circuit generates a plurality of frequencies whose constant multiples do not coincide with each other in the frequency band.

7. A frequency control method for an information processing apparatus on which a wireless module being detachably mounted comprising:
   determining a wireless communication frequency band used by the wireless module for wireless communication by referring to a database which stores pieces of information representing wireless frequency bands used by a plurality of mounted wireless modules;
   selecting an operation frequency which does not interfere with the wireless communication frequency band;
   operating said information processing apparatus on the basis of said operation frequency.

* * * * *